(12) United States Patent
Benari et al.

(10) Patent No.: US 7,710,314 B2
(45) Date of Patent: May 4, 2010

(54) PULSE RADAR RANGING SYSTEM

(75) Inventors: Uri Benari, Vaughan (CA); George Quinton Lyon, Peterborough (CA); Gabriel Serban, North York (CA)

(73) Assignee: Siemens Milltronics Process Instruments, Inc., Peterborough (CA)

( * ) Notice: Subject to any disclaimer, the term of this patent is extended or adjusted under 35 U.S.C. 154(b) by 0 days.

(21) Appl. No.: 12/315,590

(22) Filed: Dec. 4, 2008

(65) Prior Publication Data

US 2009/0189800 A1 Jul. 30, 2009

(30) Foreign Application Priority Data

Dec. 6, 2007 (EP) .................... 07023668

(51) Int. Cl.
*G01S 13/08* (2006.01)
(52) U.S. Cl. .................. 342/124; 342/175; 342/174
(58) Field of Classification Search ............. 342/124, 342/175, 173, 174, 128, 134, 159
See application file for complete search history.

(56) References Cited

U.S. PATENT DOCUMENTS

| | | | | |
|---|---|---|---|---|
| 4,521,778 A | | 6/1985 | Knepper | |
| 5,563,605 A | * | 10/1996 | McEwan | 342/202 |
| 6,072,427 A | * | 6/2000 | McEwan | 342/175 |
| 6,373,428 B1 | * | 4/2002 | McEwan | 342/175 |
| 6,700,530 B1 | * | 3/2004 | Nilsson | 342/124 |
| 6,864,833 B2 | * | 3/2005 | Lyon | 342/124 |
| 7,446,699 B2 | * | 11/2008 | McEwan | 342/199 |
| 7,518,546 B2 | * | 4/2009 | Kim et al. | 342/118 |
| 7,619,558 B2 | * | 11/2009 | Griessbaum | 342/124 |
| 7,633,434 B2 | * | 12/2009 | Serban | 342/124 |
| 2005/0001758 A1 | | 1/2005 | Hiromori et al. | |
| 2007/0210955 A1 | * | 9/2007 | McEwan | 342/175 |
| 2009/0189800 A1 | * | 7/2009 | Benari et al. | 342/134 |

FOREIGN PATENT DOCUMENTS

| | | | |
|---|---|---|---|
| EP | 1 770 409 A1 | | 4/2005 |
| GB | 2273014 A | * | 6/1994 |

* cited by examiner

*Primary Examiner*—John B Sotomayor

(57) ABSTRACT

A pulse radar ranging system having a measurement channel and a reference channel is described. In the measurement channel containing an antenna and a measurement target, the normal measurement is performed by processing an echo from the target. In the reference channel containing signal delay means, a reference echo is processed to obtain temperature compensation information.

8 Claims, 1 Drawing Sheet

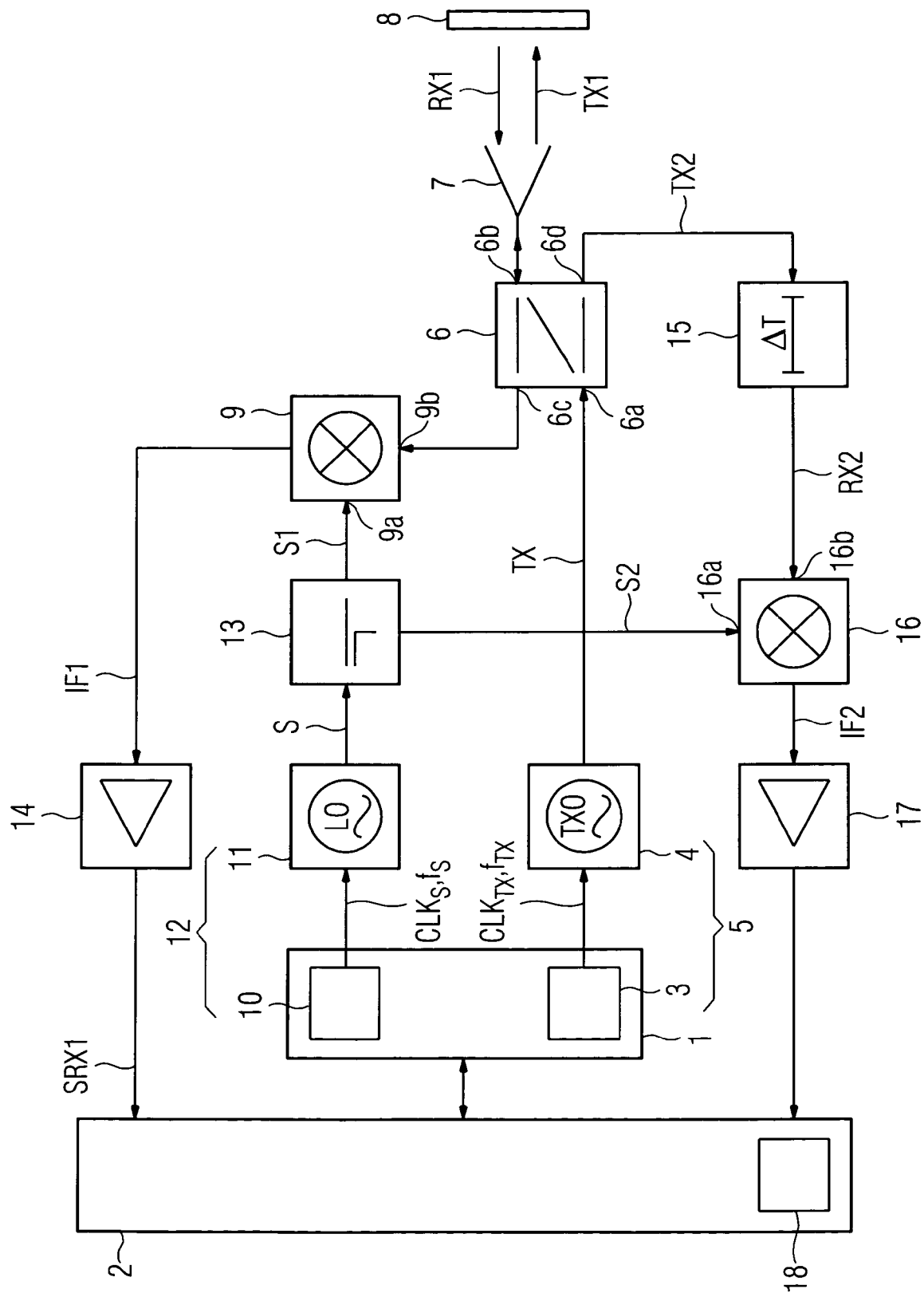

PULSE RADAR RANGING SYSTEM

CROSS REFERENCE TO RELATED APPLICATIONS

This application claims priority of European Patent Office application No. 07023668.2 EP filed Dec. 6, 2007, which is incorporated by reference herein in its entirety.

FIELD OF INVENTION

The present invention relates to a pulse radar ranging system having:
- transmit pulse generator means for generating transmit pulses at a transmit clock frequency,
- sampling pulse generator means for generating sampling pulses at a sampling clock frequency slightly different from the transmit clock frequency,
- a first signal mixer having a first signal input and a second signal input, said first signal input being coupled to the sampling pulse generator means,
- directional coupling means having a first port coupled to the transmit pulse generator means, a second port coupled to an antenna and a third port coupled to the second signal input of the first signal mixer,
- signal processing means,
- said directional coupling means being designed to convey the transmit pulses to be transmitted via the antenna to a target and to convey echo pulses reflected from the target and received by the antenna to the second signal input of the first signal mixer,
- said first signal mixer being designed to generate a first intermediate frequency signal by mixing the echo pulses with the sampling pulses, and
- said signal processing means being designed to evaluate the first intermediate frequency signal to determine the target distance.

BACKGROUND OF INVENTION

Such a pulse radar ranging system is known from U.S. Pat. No. 4,521,778.

Pulse radar ranging systems provide distance or level measurement based on the direct measurement of the running time of microwave pulses transmitted to and reflected from a target, e.g. the surface of a fill material in a container. As the running time for distances of a few meters is in the nanosecond range, a special time transformation procedure is required to enable these short time periods to be measured. The microwave pulses generated by a transmit pulse generator means are transmitted to the target at a repetition rate or transmit clock frequency. In a signal mixer, the received echo pulses reflected from the target are sampled by cross-correlation with sampling pulses of the same shape as the transmit pulses but at a sampling clock frequency slightly lower than the transmit clock frequency. The cross-correlation and subsequent integration or low-pass filtering leads to an intermediate frequency (IF) signal corresponding to the received echo pulses but time-expanded relative thereto by a factor $T1/(T1-T2)$, where $T1$ is the transmit pulse repetition period and $T2$ is the sampling period. The time-expansion allows for amplifying, digitizing and further processing of the echo pulses with standard techniques.

One of the sources of errors in level measurement using pulse radar is the temperature drift. Due to variation of the parameters of the semiconductor devices of the pulse radar, the level measurement result will change over the specified temperature range of e.g. $-40$ to $+80°$ C. without a real change of the measured level. The temperature drift is specified in ppm/° C. and the pulse radars on the market today generally meet $+/-30$ ppm/° C. specification. A reduction of the temperature drift is desirable as the error can be important for far away targets For example, at $+80°$ C. or $-40°$ C. and at a target distance of 20 m the error can reach 36 mm. The temperature drift is produced by changes of the timing and or shape of the transmitting and sampling pulses over temperature and changes of the time base slope (i.e. the difference between the transmit and sampling clock frequencies) over temperature.

From EP 1 770 409 A1 a pulse radar ranging system is known, where a controllable switch, depending on a control signal, either conveys the transmit pulses to the antenna to be transmitted to the target or to a calibration module, preferably a delay line of known delay and terminated with a pulse reflecting impedance mismatch.

SUMMARY OF INVENTION

It is an object of the invention to allow for continuously correction of errors due to changes in the environment temperature of pulse radar ranging systems.

This object is achieved by the pulse radar ranging system of the type initially mentioned in that the system further has:
- said directional coupling means having a fourth port and being designed to divide the transmit pulses received at the first port into first transmit pulse portions directed to the second port and second transmit pulse portions directed to the fourth port,
- a second signal mixer having a first signal input and a second signal input,
- signal delay means arranged between the fourth port of the directional coupling means and the second signal input of the second signal mixer,
- splitting means arranged between the sampling pulse generator means and the respective first signal inputs of the first and second signal mixers to divide the sampling pulses into first sampling pulse portions conveyed to the first signal mixer and second sampling pulse portions conveyed to the second signal mixer,
- said second signal mixer being designed to generate a second intermediate frequency signal by mixing the second transmit pulse portions with said second sampling pulse portions, and
- said signal processing means (2, 14, 17) being designed to further evaluate the second intermediate frequency signal (IF1) for correcting the determination of the target distance.

The pulse radar ranging system thus has a measurement channel, which contains the antenna and target and performs the normal level measurement, and a reference channel, which contains the signal delay means and is used to obtain temperature compensation information. As the electronic circuits of both channels are at the same temperature, the temperature compensation information can be used to compensate for temperature-related variations in the level measurement result.

To reduce the effect of the pulse shape and timing, the transmit pulses are equally split in two transmit pulse portions, one portion directed along the measurement channel and the other one along the reference channel. To further reduce the effect of the pulse shape and timing the sampling pulses are split in two equal portions, one applied to the first signal mixer in the measurement channel and the other to the second signal mixer in the reference channel.

Other approaches are possible, but they need switches that at high frequencies (e.g. 25 GHz) are expensive and difficult to obtain, design, manufacture and tune. The proposed approach uses low cost components with average performance which are easy to obtain, manufacture and tune.

The second transmit pulse portions are directed through the signal delay means of known delay and stable over temperature to the second signal mixer where they are mixed with the second transmit pulse portions. The thus obtained second intermediate frequency signal is processed in the same way as the first intermediate frequency signal in the measurement channel to determine the delay time of the signal delay means.

During the factory calibration of the pulse radar, the delay time along the reference path at a preset temperature can be measured and stored. During the operation, the pulse radar will measure the signal delay over the reference channel and use this value and the stored reference value to calculate the correction for the measured level.

The measurement on the reference channel can be done for each level measurement sequence, which, however, may slow down the level measurement process. Preferably, the measurement on the reference channel is done after a preset number of level measurements or when the temperature changes by a preset number of degrees. Thus, the temperature drift can be reduced below +/−10 ppm/° C.

In summary, the following advantages are obtained:

- The correction is based only on the propagation along the signal delay means in the reference channel using the same measurement techniques as those used in the measurement channel. This reduces the possibility of new errors or additional corrections and does not require added software for measurement, but only for computation of the correction.
- The same transmit pulses are applied on both the measurement and the reference channels. Further, the same sampling pulses are applied on both the measurement and the reference channels. This way, the change of the pulse shape and timing over temperature is minimized. Contrary to this, using two different transmit pulse generator means or sampling pulse generator means would introduce supplementary errors due to the differences between the pulse generator means.
- The correction is made continuously during the operation of the pulse radar.
- There is no need to use lookup-tables or time consuming factory calibration.

BRIEF DESCRIPTION OF THE DRAWING

The invention will be now described by way of a preferred example and with reference to the single FIGURE accompanying drawing, which shows in a block diagram the basic components of a pulse radar ranging system.

DETAILED DESCRIPTION OF INVENTION

A time base control circuit 1, which is under control of a microcontroller 2, contains a transmit clock generator 3 for generating a transmit clock $CLK_{TX}$ at a transmit clock frequency $f_{TX}$ in the MHz range. The transmit clock $CLK_{TX}$ triggers a transmit oscillator 4 for generating microwave transmit pulses TX with a pulse repetition rate equal to the transmit clock frequency $f_{TX}$. The transmit pulses TX may have a duration of 1 ns and a frequency in the GHz range. The transmit clock generator 3 in combination with the transmit oscillator 4 constitute transmit pulse generator means 5 which is coupled to a first port 6a of a directional coupler (hybrid) 6.

First transmit pulse portions TX1 of the transmit pulses TX are transmitted through the directional coupler 6 and an antenna 7 coupled to a second port 6b of the coupler 6 to a target 8, e.g. the surface of a fill material in a container. The target 8 reflects the transmit pulse portions TX1 back as echo pulses RX1 which are received by the antenna 7. The received echo pulses RX1 are passed through the directional coupler 6 via a third port 6c to the second one, 9b, of two signal inputs 9a, 9b of a first signal mixer 9.

The time base control circuit 1 further contains a sampling clock generator 10 for generating a sampling clock $CLK_S$ at a sampling clock frequency $f_S$ which is slightly lower (for instance by a few kHz) than the transmit clock frequency $f_{TX}$. The sampling clock $CLK_S$ triggers a local oscillator 11 for generating sampling pulses S of the same shape and frequency as the transmit pulses TX and with a pulse repetition rate equal to the sampling clock frequency $f_S$. The sampling clock generator 10 in combination with the transmit oscillator 11 constitute sampling pulse generator means 12. The sampling pulses S are divided by means of a splitter 13 into equal first and second sampling pulse portions S1, S2. The first sampling pulse portions S1 are conducted to the first signal input 9a of the signal mixer 9 which generates an intermediate frequency signal IF1 by multiplying the received echo pulses RX1 by the first sampling pulse portions S1. As the pulse repetition rate of the sampling pulses S or first sampling pulse portions S1 is slightly lower than that of the transmit pulses TX or first transmit pulse portions TX1, the first sampling pulse portions S1 will sweep in small increments per measuring cycle over the transmit or echo pulse interval so that the received echo pulses RX1 are sampled by cross-correlation with the first sampling pulse portions S1. The cross-correlation and subsequent integration and amplification by an IF amplifier 14 lead to a signal SRX1 which is expanded in time and in shape corresponds to the received echo pulses RX1. This signal SRX1 is further processed in the microcontroller 2 for determining the running time of the first transmit pulse portions TX1 to the target 8 and thus the distance of the target 8 from the antenna 7.

The directional coupling means 6 has a fourth port 6d and is designed to divide the transmit pulses TX received at the first port 6a into the first transmit pulse portions TX1 directed to the second port 6b and second transmit pulse portions TX2 directed to the fourth port 6d. The second transmit pulse portions TX2 are transmitted through a delay means 15 to the second one, 16b, of two signal inputs 16a, 16b of a second signal mixer 16. The first signal input 16a receives the second sampling pulse portions S2 from the splitter 13, and the second signal mixer 16 generates a second intermediate frequency signal IF2 by correlating the delayed second transmit pulse portions TX2 with the second sampling pulse portions S2. The second intermediate frequency signal IF2 is integrated and amplified in a second IF amplifier 17 and further processed in the microcontroller 2 for determining the delay time ΔT of the second transmit pulse portions TX2.

The pulse radar ranging system thus has a measurement channel and a reference channel. In the measurement channel containing the antenna 7 and target 8, the normal level measurement is performed by processing the echo RX1 from the target 8. In the reference channel containing the signal delay means 15, a reference echo RX2 represented by the delayed second transmit pulse portions TX2 is processed to obtain temperature compensation information. During the factory calibration of the pulse radar ranging system, the delay time ΔT along the reference path at a preset temperature is measured and stored in an internal register 18 of the microcontroller 2. During the operation the pulse radar ranging system will measure the ΔT delay of the second transmit pulse portions TX2 over the reference channel and the microcontroller 2 will use this value and the stored reference value to calculate a correction for the measured distance of the target 8.

As the microwave components are not ideal, there is a leakage of the signal between the measurement channel and the reference channel due to the limited isolation of the directional coupler 6. Because of that, when the target 8 is close to the antenna 7 a second echo will be present in the reference channel, close to the reference echo RX2 and may affect the measurement if it is of comparable amplitude with the reference echo RX2. Also reflection at the input 16b of the second signal mixer 16 in the reference channel will be leaked into the measurement channel and produce there an echo at approximately two times the length of the reference channel. The influence of the leakage between the measurement and reference channels can be reduced by appropriate leveling the signals in the channels. For that purpose, the signal delay means 15 should be lossy and is therefore preferably configured as a line 19 or cable.

The invention claimed is:

1. A pulse radar ranging system, comprising:
  transmit pulse generator means for generating transmit pulses at a transmit clock frequency;
  sampling pulse generator means for generating sampling pulses at a sampling clock frequency slightly different from the transmit clock frequency;
  a first signal mixer having a first signal input and a second signal input, the first signal input being coupled to the sampling pulse generator means;
  a second signal mixer having a first signal input and a second signal input;
  directional coupling means having a first port coupled to the transmit pulse generator means, a second port coupled to an antenna, a third port coupled to the second signal input of the first signal mixer, and a fourth port;
  signal processing means;
  splitting means arranged between the sampling pulse generator means and the respective first signal inputs of the first and second signal mixers to divide the sampling pulses into first sampling pulse portions conveyed to the first signal mixer and second sampling pulse portions conveyed to the second signal mixer; and
  signal delay means arranged between the fourth port of the directional coupling means and the second signal input of the second signal mixer.

2. The pulse radar ranging system as claimed in claim 1, wherein the directional coupling means convey transmit pulses to be transmitted via the antenna to a target and to convey echo pulses reflected from the target and received by the antenna to the second signal input of the first signal mixer.

3. The pulse radar ranging system as claimed in claim 2, wherein the first signal mixer generates a first intermediate frequency signal by mixing the echo pulses with the sampling pulses.

4. The pulse radar ranging system as claimed in claim 3, wherein the signal processing means evaluate the first intermediate frequency signal to determine the target distance.

5. The pulse radar ranging system as claimed in claim 4, wherein the directional coupling means divide the transmit pulses received at the first port into first transmit pulse portions directed to the second port and second transmit pulse portions directed to the fourth port.

6. The pulse radar ranging system as claimed in claim 5, wherein the second signal mixer generates a second intermediate frequency signal by mixing the second transmit pulse portions with said second sampling pulse portions.

7. The pulse radar ranging system as claimed in claim 6, wherein the signal processing means further evaluates the second intermediate frequency signal for correcting the determination of the target distance.

8. The pulse radar ranging system as claimed in claim 1, wherein the signal delay means have a delay line.

* * * * *